United States Patent Office 2,736,739
Patented Feb. 28, 1956

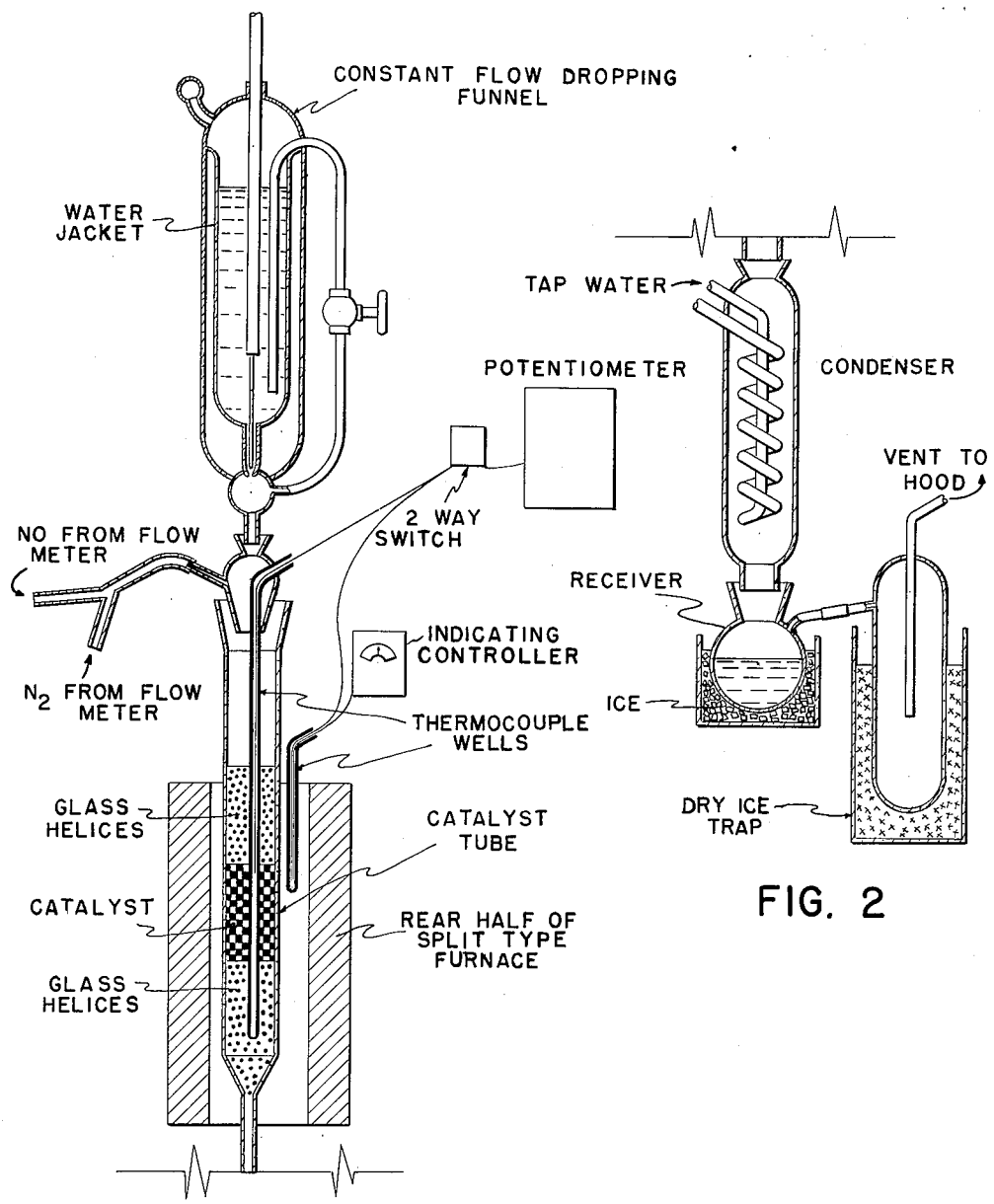

2,736,739

PREPARATION OF NITRILES

David C. England, Marshallton, Del., and Gene V. Mock, Woodbury, N. J., assignors to E. I. du Pont de Nemours & Company, Wilmington, Del., a corporation of Delaware Application August 5, 1952, Serial No. 302,782

9 Claims. (Cl. 260—465)

This invention relates to a new process for preparing nitriles. The few processes known to the prior art for the formation of nitriles from hydrocarbons have been characterized by various disadvantages, such as low conversions and yields, excessive carbonization, by-product formation, and the like.

The object of the present invention is a new and improved process for the preparation of nitriles, and one characterized by freedom from the foregoing disadvantages. Other objects will be appreciated from the following description of the invention.

The present invention is a process for the preparation of nitriles which comprises reacting nitric oxide with alkyl-substituted organic compounds containing at least one alkyl group directly attached to a carbon atom which is in turn joined to another carbon atom by a double bond. The reaction is carried out at temperatures between 400° and 700° C. in the presence of a dehydrogenation catalyst. The reaction product is exceptionally clean, containing only unreacted starting material, nitrile, water, and a trace of residue.

The details of the invention will be more readily appreciated by referring to the drawing and the description of the same, as well as to the examples set forth in the following.

Figure 1 of the drawing is a view in cross section of the upper portion of the apparatus of the invention. Figure 2 is a similar view of the lower portion.

Referring to the drawing in greater detail, the catalyst tube is about 22 inches long and 24 mm. O. D. It is heated by a split-type, vertically mounted, 12-inch electric furnace. In an actual operation, the tube is packed with 50 cc. of catalyst of 8-14 mesh, which occupies about 5½ inches, starting with the hottest spot in the tube (about 4 inches from the top). The remainder of the heated portion is packed with glass helices. A 5-mm. O. D. glass tube running down the center of the catalyst tube serves as a thermocouple well and permits location of the hot-spot in the catalyst bed. The temperature of the furnace is suitably regulated through a thermocouple in a 5-mm. O. D. glass tube. This tube is located outside the catalyst tube, about 4 inches from the top, because this is found to be the hottest spot in the furnace. The top of the catalyst tube is fitted with a gas inlet tube and a grind for attaching a water-jacketed, controlled constant flow dropping funnel. The upper portion of the catalyst tube is packed with glass helices to serve as a pre-heater and gas mixing space and after passing through the catalyst bed the gases are directed through a water-cooled condenser. The condensed liquids are collected in a receiver and the vapors are passed through a Dry-Ice trap for further condensing before venting to the hood. If high melting solids are obtained, the water-cooled condenser is omitted.

In starting a run, it is desirable to condition the catalyst under nitrogen and nitric oxide at a starting furnace temperature of 200° to 400° C. After this conditioning step, the compound which is to be nitrosated, for example, toluene, is added through the capillary feed-dropping funnel. The addition is calibrated and adjusted in drops per minute to give the desired rate. Periodically during the run there is recorded furnace and hot-spot temperatures (determined by potentiometer readings), location of the hot-spot in the catalyst bed, and rate of addition of compound. The furnace temperature is usually raised in 50° C. increments until an exothermic reaction occurs. At the end of the run, the Dry-Ice trap is allowed to warm up to room temperature and the liquid obtained is added to the main condensate. The crude condensate is distilled directly at atmospheric pressure, giving an azeotrope from which the water is separated. Distillation is continued under reduced (usually 20 mm.) pressure to separate the desired nitrile which is weighed and routinely identified by boiling point and refractive index. A Dry-Ice trap is generally maintained in the vacuum distillation train to recover any water or unconverted organic compound which might escape.

The percent conversions given in Table I are calculated on the basis of the amount of material isolated, as compared to the theoretical yield from the amount of material charged. The amount of starting material consumed is taken as the amount charged less the amount separated from water in the distilled azeotrope. Percent yield is based on the amount of nitrile distilled compared to the theoretical yield from the amount of material consumed.

Table I summarizes the results of a series of runs carried out in the apparatus of Figure 1, operating as described above.

TABLE I

*(All runs with 50 g. of starting material)*

| Examples | Catalyst (50 cc. 8-14 mesh) | Input (l./hr. as gas at S. T. P.) | | | | Reaction Conditions | | | Percent Conversion | Percent Yield | Nitrile Product |
|---|---|---|---|---|---|---|---|---|---|---|---|
| | | NO | N₂ | Starting Material | H₂O | Space Velocity (Hrs.)⁻¹ | Average Furnace Temp. (° C.) | Average Hot-Spot Temp. (° C.) | | | |
| 1 | MoO₃-V₂O₅-P₂O₅-on-charcoal | 8 | 16 | Toluene 6 | 0 | 600 | 340 | 450 | 7.3 | 32.5 | Benzonitrile. |
| 2 | Ca-Ni-PO₄ | 8 | 16 | 6 | 0 | 600 | 490 | 483 | 2.9 | 55.2 | Do. |
| 3 | MoO₃-Al₂O₃ | 8 | 16 | 6 | 0 | 600 | 485 | 580 | 5.5 | 21.4 | Do. |
| 4 | Ag-on-Al₂O₃ | 8 | 16 | 6 | 0 | 600 | 530 | 537 | 5.7 | 46.1 | Do. |
| 5 | Pd-on-charcoal | 8 | 16 | 6 | 0 | 600 | 380 | 560 | 12.1 | 66.0 | Do. |
| 6 | Fe₂O₃-on-magnesia | 8 | 16 | 6 | 0 | 600 | 440 | 500 | 13.8 | 67.2 | Do. |
| 7 | Coconut charcoal | 8 | 16 | 6 | 0 | 600 | 540 | 540 | 6.8 | 22.4 | Do. |
| 8 | V₂O₅-on-Alundum | 8 | 16 | 6 | 0 | 600 | 450 | 470 | 3.0 | 26.6 | Do. |
| 9 | Ag-on-charcoal | 8 | 16 | 6 | 0 | 600 | 448 | 468 | 25.6 | 92.4 | Do. |
| 10 | Ag-on-SiO₂ | 8 | 0 | 6 | 16 | 600 | 440 | 510 | 23.2 | 81.4 | Do. |
| 11 | Ag-on-SiO₂ | 1.6 | 9.8 | 1.2 | 2.4 | 300 | 490 | 490 | 27.3 | 91.0 | Do. |
| 12 | Ag-on-SiO₂ | 3.2 | 19.6 | 2.4 | 4.8 | 600 | 490 | 490 | 17.0 | 88.5 | Do. |
| 13 | Ag-on-charcoal | 8 | 16 | p-Xylene 6 | 0 | 600 | 400 | 425 | 12.0 | 43.3 | p-Tolunitrile and Benzonitrile. |
| 14 | Ag-on-SiO₂ | 8 | 16 | 6 | 0 | 600 | 530 | 532 | 3.1 / 5.4 | 11.5 / 62.8 | Terephthalonitrile. / p-Tolunitrile and Benzonitrile. |
| 15* | Ag-on-SiO₂ | 6 | 21 | 3 | 0 | 150 | 470 | 510 | 1.4 / 2.4 | 16.3 / 9.8 | Terephthalonitrile. / p-Tolunitrile and Benzonitrile. |
| 16 | Ag-on-charcoal | 8 | 16 | o-Xylene 6 | 0 | 600 | 488 | 500 | 17.0 / 5.5 / 2.5 | 70.3 / 43.8 / 20.0 | Terephthalonitrile. / o-Tolunitrile and Benzonitrile. / o-Phthalonitrile. |
| 17 | Ag-on-charcoal | 8 | 16 | m-Xylene 6 | 0 | 600 | 386 | 450 | 10.4 / 8.2 | 41.3 / 32.6 | m-Tolunitrile and Benzonitrile. / m-Phthalonitrile. |
| 18 | Ag-on-charcoal | 8 | 16 | β-Picoline 6 | 0 | 600 | 440 | 460 | 24.3 | 81.0 | Nicotinonitrile. |
| 19 | Ag-on-SiO₂ | 8 | 16 | Ethylbenzene 6 | 0 | 600 | 585 | 650 | 6.0 | 71.0 | Benzonitrile. |
| 20 | Ag-on-SiO₂ | 8 | 16 | Cumene 6 | 0 | 600 | 585 | 650 | 1.8 | 18.5 | Do. |
| 21 | Ag-on-SiO₂ | 16 | 8 | p-Tolunitrile 6 | 0 | 600 | 490 | 510 | 26.0 | 79.2 | Terephthalonitrile. |
| 22 | Ag-on-SiO₂ | 8 | 16 | 2-Chlorotoluene 6 | 0 | 600 | 500 | 498 | | | 0.1 g. p-Chlorobenzonitrile (M. P. 89–91° C.). |

*Reduction with sugar was omitted in preparation of this catalyst, and the amount of catalyst used was 200 cc.

The silver-on-alumina catalyst of Example 4 was prepared essentially as described in U. S. 2,424,083 as follows:

To a solution of 5 grams of silver nitrate in 200 cc. of distilled water there was added 100 cc. of 8–14 mesh alumina. The mixture was boiled for 15 minutes and cooled to 20° C. To the cooled mixture, there was slowly and successively added, with stirring, 6 cc. of 28% ammonia solution and 100 cc. of 0.8 N sodium hydroxide solution. An additional 3 cc. of 28% ammonia was added and the stirring continued for about 5 minutes. A reducing solution was prepared by dissolving 8 grams of cane sugar in 80 cc. of water, adding 10 cc. of ethyl alcohol and 0.35 cc. of concentrated nitric acid, and boiling the resulting solution for about 5 minutes. The cooled reducing solution (12 cc.) was rapidly added to the above mixture of alumina and silver salt solution. The resulting mixture was allowed to stand for one hour with occasional shaking. It was then washed several times by decantation with distilled water and finally filtered and dried in air. Alternatively, the silver catalyst may be prepared without effecting the reduction in sugar, by simply impregnating the support with the diaminesilver hydroxide and then reducing thermally at the temperature of reaction.

The silver-on-charcoal catalyst of Examples 9, 13, 16, 17, and 18 was made as first described above, substituting 8-14 mesh charcoal for the alumina.

The silver-on-silica catalyst of Examples 10, 11, 12, 14, 15, 19, 20, 21, and 22 was made as described above, substituting acid-washed 8-14 mesh silica for the alumina.

In place of the specific catalysts of the examples, there can be used, with satisfactory results, any catalyst known to promote dehydrogenation reactions. Examples of such are silver, iron, ruthenium, tin, lead, cadmium, platinum, palladium, etc., either as the free metals or as oxides or salts such as the chromites, molybdites, tungstites, etc. of these metals. These catalysts may be unextended or extended on such materials as charcoal, pumice, keiselguhr, fuller's earth, silica, alumina, thoria, and the like. The preferred catalyst, because of its ruggedness and effectiveness in promoting nitrile formation with minimum of side reaction product formation, is silver, especially silver extended on charcoal, silica, or alumina.

The mole ratio of nitric oxide to alkyl-substituted organic compound depends upon the particular compound being reacted. Thus, with toluene, the required mole ratio of nitric oxide to toluene is 1.5. High ratios of nitric oxide to alkyl-substituted organic compound tend to promote overoxidation, which can be compensated for by dilution with nitrogen and/or water vapor and by higher space velocities. For maximum conversion to nitrile, it is desirable to use the highest possible mole ratio of nitric oxide to the compound nitrosated without causing loss in yield due to oxidation. With toluene, for example, the operable range of mole ratios of nitric oxide to toluene is about 0.5 to 3.0. With the xylenes higher mole ratios of nitric oxide to xylene give better results (ca. 2.0 to 5.0).

In the foregoing, we have described the application of the invention to alkyl-substituted cyclic compounds. We shall now proceed to describe its application to acyclic compounds. In an apparatus identical with Figure 1 in the drawing, except that the furnace was 19 inches in overall length and the tube 57 mm. O. D., there were placed 200 cc. of a silver-on-SiO$_2$ catalyst. Mixtures of propylene, nitric oxide, and nitrogen were passed over the catalyst under the conditions given in the table below. The products were condensed in Dry-Ice traps and consisted of ammonium carbonate, water, and an organic layer. The organic layer was dried over magnesium sulfate and distilled. It boiled at 77–78° C. and gave fractions having $N_D^{30}$ 1.3750–1.3790, identified as acrylonitrile by preparing the tert.-butylamide derivative, M. P. 128° C., alone and in admixture with an authentic sample of the tert.-butylamide of acrylonitrile.

The conversion values given in the table are based on the reaction $4C_3H_6 + 6NO \rightarrow 4C_3H_3N + N_2 + 6H_2O$.

TABLE II

| Gas Feed, Liter/hr. at S. T. P. | | | Space Velocity, hrs.$^{-1}$ | Furnace Temp., °C. | Hot-Spot Temp., °C. | Percent Conversion to Acrylonitrile |
| --- | --- | --- | --- | --- | --- | --- |
| NO | N$_2$ | Propylene | | | | |
| 5 | 91.7 | 3.3 | 500 | 475 | 500 | 11.2 |
| 3 | 55.0 | 2.0 | 300 | 465 | 500 | 12.2 |
| 5 | 93.0 | 2.0 | 500 | 430 | 500 | 11.3 |
| 5 | 91.7 | Isobutylene 3.3 | 500 | 460 | 500 | 2.1 |

The nitrosation reaction of this invention is operable at temperatures in the range of 400° to 700° C. As a rule, good results from the standpoint of yield of desired nitrile with minimum of side reaction product formation are obtained in the more restricted range of 450° to 550° C. and the nitrosation is therefore generally conducted at temperatures in this range. With silver catalysts the best results are obtained in the range of 450° to 550° C. and this is the range generally employed in operating with this catalyst.

The process of this invention is a continuous vapor-phase nitrosation. The amount of organic compound nitrosated at any one time is less than the catalyst weight but the amount processed during any given run is several times the catalyst weight.

Inert diluents such as nitrogen and water vapor may be used in the reaction mixture, often to advantage in controlling overoxidation obtained with mixtures high in nitric oxide concentrations.

Space velocity is not a critical condition and may be varied over wide limits without sensibly affecting the efficiency of the process. Thus, space velocities as low as 20 hrs.$^{-1}$ or as high as 2000 hrs.$^{-1}$ may be used without appreciable variation in the yield of desired nitrile. Lower space velocities are best employed with gas mixtures having low nitric oxide concentrations since these conditions permit higher conversion to nitrile without loss in yield due to oxidation. Conversely, high space velocities are best employed to avoid overoxidation with gas mixtures high in nitric oxide concentration. With toluene over silver-on-silica or silver-on-charcoal yields of 82 to 92% at 17 to 35% conversions have been obtained at space velocities varying from 300 to 600 hrs.$^{-1}$.

It will be appreciated, therefore, that the nitrosation process of this invention is applicable to any alkyl-substituted organic compound containing at least one alkyl group directly attached to a carbon atom which is in turn attached to another carbon atom by a double bond. The methyl-substituted compounds of this type are preferred because of (1) ready availability, and (2) freedom from complicating cleavage side reaction. Examples of compounds usefully employable in the process of this invention are toluene, the xylenes, mesitylene, 1-methyl-2-ethylbenzene, 1-phenyl-4-methylbenzene, m-tertiary-butyltoluene, 2-methylpyridine, 2-methyl-5-ethylpyridine, 3-methylpyridine, methylnaphthalene, 2-methylthiophene, 2-chlorotoluene, 2-nitrotoluene, 2-methylfurane, and the like, propylene, butylenes, methyl-substituted butadienes, such as isoprene, 2,3-dimethylbutadiene, and the like.

The process of this invention is a vapor-phase nitrosation and any unconverted reactants may be re-cycled with fresh reactants and the overall efficiency of the nitrosation thus improved.

The vapor-phase nitrosation of this invention provides a one-step route to nitriles. Thus, it provides a one-step route to terephthalonitrile from p-xylene, to isophthalonitrile from m-xylene, and to nicotinonitrile from beta-picoline.

It will be appreciated that many modifications may be made without departing from the scope of the invention. As generally operated the process is carried out at atmospheric pressures. If desired, however, pressures above atmospheric can be used to increase the throughput of gas without increasing the size of the reactor. Accordingly, it is to be limited only by the following patent claims.

We claim:

1. The process for the preparation of nitriles which comprises reacting nitric oxide with an alkyl-substituted organic compound containing at least one alkyl group directly attached to a carbon atom which is in turn attached to another carbon atom by a double bond, said reaction being carried out at temperatures between 400° and 700° C. in the presence of a dehydrogenation catalyst.

2. The process for the preparation of nitriles which comprises reacting nitric oxide with a methyl-substituted organic compound containing at least one methyl group directly attached to a carbon atom which is in turn attached to another carbon atom by a double bond, said reaction being carried out at temperatures of 400° to 700° C., in the presence of a dehydrogenation catalyst.

3. The process for the preparation of nitriles which comprises reacting nitric oxide with an alkyl-substituted aromatic compound having at least one alkyl group directly attached to an aromatic carbon atom, said reaction being carried out at temperatures between 400° and 700° C., in the presence of a dehydrogenation catalyst.

4. The process for the preparation of nitriles which comprises reacting nitric oxide with an alkyl-substituted acyclic organic compound containing at least one alkyl group directly attached to an ethylenic carbon atom, said reaction being carried out at temperatures between 400° and 700° C., in the presence of a dehydrogenation catalyst.

5. The process of claim 1, characterized in that the alkyl-substituted organic compound is toluene.

6. The process of claim 1, characterized in that the alkyl-substituted organic compound is a xylene.

7. The process of claim 1, characterized in that the alkyl-substituted organic compound is propylene.

8. The process of claim 1, characterized in that the alkyl-substituted organic compound is toluene and the catalyst is silver extended on an inert support.

9. The process of claim 1, characterized in that the catalyst is silver on silica.

References Cited in the file of this patent

UNITED STATES PATENTS

| | | |
| --- | --- | --- |
| 1,920,795 | Jaeger | Aug. 1, 1933 |
| 2,076,953 | Lacy | Apr. 13, 1937 |
| 2,083,824 | Bond | June 15, 1937 |
| 2,463,456 | Denton et al. | Mar. 11, 1949 |
| 2,481,826 | Cosby | Sept. 13, 1949 |
| 2,499,055 | Cosby et al. | Feb. 28, 1950 |
| 2,553,331 | Prill | May 15, 1951 |

OTHER REFERENCES

Maihle et al.: Chem. Abstracts, vol. 15, pg. 370 (1920).
Zimakov: Chem. Abstracts, vol. 24, pg. 691 (1930).
Platonov et al.: Chem. Abstracts, vol. 29, pg. 1769 (1935).